United States Patent
Pu et al.

(10) Patent No.: US 10,925,092 B2
(45) Date of Patent: Feb. 16, 2021

(54) REQUEST TO SEND (RTS)/CLEAR TO SEND (CTS) USING A SELF-CONTAINED SLOT

(71) Applicant: Apple Inc., Cupertino, CA (US)

(72) Inventors: Tianyan Pu, Cupertino, CA (US); Wei Zhang, Santa Clara, CA (US); Wei Zeng, San Diego, CA (US); Haitong Sun, Irvine, CA (US); Johnson O. Sebeni, Fremont, CA (US); Dawei Zhang, Saratoga, CA (US); Sami M. Almalfouh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 16/278,984

(22) Filed: Feb. 19, 2019

(65) Prior Publication Data

US 2019/0274165 A1 Sep. 5, 2019

Related U.S. Application Data

(60) Provisional application No. 62/643,360, filed on Mar. 15, 2018, provisional application No. 62/637,301, filed on Mar. 1, 2018.

(51) Int. Cl.
*H04W 74/08* (2009.01)
*H04B 7/08* (2006.01)
(Continued)

(52) U.S. Cl.
CPC ...... *H04W 74/0816* (2013.01); *H04B 7/0617* (2013.01); *H04B 7/0695* (2013.01);
(Continued)

(58) Field of Classification Search
CPC ......... H04W 74/0816; H04W 72/0446; H04W 72/1215; H04W 74/002; H04W 16/28;
(Continued)

(56) References Cited

U.S. PATENT DOCUMENTS 7,474,641 B2 * 1/2009 Kuroda ............... H04B 7/0619
370/329
8,504,063 B2 * 8/2013 Ekbatani ............... H04W 76/14
455/456.1

(Continued)

FOREIGN PATENT DOCUMENTS

JP 2003018074 A 1/2003
WO WO 02/082751 A2 10/2002
(Continued)

OTHER PUBLICATIONS

Apple Inc.; "NR Unlicensed Considerations", 3GPP Draft; R1-1802287; 3RD Generation Partnership Project (3GPP), Mobile Competence Centre, 650 Route Des Lucioles, F-06921 Sophia-Antipolis Cedex, France; vol. RAN WG1, No. Athens, Greece; Feb. 17, 2018; six pages.

(Continued)

*Primary Examiner* — Omar J Ghowrwal
(74) *Attorney, Agent, or Firm* — Kowert, Hood, Munyon, Rankin & Goetzel, P.C.

(57) ABSTRACT

Apparatuses, systems, and methods for a wireless device and base station transmitting and/or receiving request to send (RTS) and clear to send (CTS) messages in 5G New Radio. The RTS/CTS messages may be comprised within a single self-contained mini slot. The RTS/CTS message design may provide for link adaptation and/or beamforming.

20 Claims, 9 Drawing Sheets

(51) Int. Cl.
  *H04B 7/06*     (2006.01)
  *H04B 17/318*   (2015.01)
  *H04W 72/12*    (2009.01)
  *H04W 74/00*    (2009.01)
  *H04L 1/00*     (2006.01)
  *H04W 16/28*    (2009.01)
  *H04W 72/04*    (2009.01)
  *H04W 28/02*    (2009.01)
  *H04L 12/58*    (2006.01)

(52) U.S. Cl.
  CPC .......... *H04B 7/088* (2013.01); *H04B 17/318* (2015.01); *H04L 51/04* (2013.01); *H04W 28/0289* (2013.01); *H04W 28/0294* (2013.01); *H04W 72/0446* (2013.01); *H04W 72/1215* (2013.01); *H04W 74/002* (2013.01); *H04L 1/0003* (2013.01); *H04W 16/28* (2013.01)

(58) Field of Classification Search
  CPC .......... H04W 28/0289; H04W 28/0294; H04B 7/088; H04B 7/0695; H04B 7/0617; H04B 17/318; H04L 1/0003; H04L 51/04
  See application file for complete search history.

(56) References Cited

U.S. PATENT DOCUMENTS

| | | | |
|---|---|---|---|
| 9,717,098 B2 | 7/2017 | Bhushan et al. | |
| 10,142,765 B2 | 11/2018 | Tuset Peiro et al. | |
| 2005/0285803 A1* | 12/2005 | Iacono | H04B 7/0695 343/702 |
| 2007/0195974 A1* | 8/2007 | Li | H04B 7/043 381/94.3 |
| 2011/0110351 A1* | 5/2011 | Seok | H04W 72/0446 370/338 |
| 2011/0305236 A1* | 12/2011 | Morioka | H04W 74/0808 370/345 |
| 2012/0176937 A1* | 7/2012 | Kadambi | H04W 76/15 370/255 |
| 2013/0322277 A1 | 12/2013 | Vanganuru et al. | |
| 2016/0112107 A1* | 4/2016 | Wang | H04B 7/0617 370/329 |
| 2016/0150552 A1 | 5/2016 | Sadiq et al. | |
| 2016/0174206 A1* | 6/2016 | Xia | H04B 7/063 370/329 |
| 2016/0212733 A1* | 7/2016 | Davydov | H04L 5/0035 |
| 2017/0142605 A1* | 5/2017 | Cheng | H04B 7/0617 |
| 2017/0331670 A1 | 11/2017 | Parkvall et al. | |
| 2017/0367110 A1 | 12/2017 | Li et al. | |
| 2018/0124806 A1 | 5/2018 | Kim et al. | |
| 2018/0206126 A1 | 7/2018 | Zhang et al. | |
| 2018/0248581 A1 | 8/2018 | Chae et al. | |
| 2019/0104547 A1* | 4/2019 | Xue | H04B 7/0617 |
| 2019/0215140 A1* | 7/2019 | Hafeez | H04L 27/0006 |
| 2019/0274165 A1* | 9/2019 | Pu | H04W 72/0446 |

FOREIGN PATENT DOCUMENTS

| | | | | |
|---|---|---|---|---|
| WO | 2017099860 A1 | 6/2017 | | |
| WO | WO 2017/105310 A1 | 6/2017 | | |
| WO | WO-2018067059 A1 * | 4/2018 | ........... | H04B 7/0626 |

OTHER PUBLICATIONS

Extended European Search Report; European Patent Application No. 19159720.2; dated Jun. 26, 2019; nine pages.

* cited by examiner

REQUEST TO SEND (RTS)/CLEAR TO SEND (CTS) USING A SELF-CONTAINED SLOT

PRIORITY CLAIM

This application claims priority to U.S. provisional patent application Ser. No. 62/637,301, entitled "Request to Send/Clear to Send Design in 5G," filed Mar. 1, 2018, which is hereby incorporated by reference in its entirety as though fully and completely set forth herein. This application also claims priority to U.S. provisional patent application Ser. No. 62/643,360, entitled "Request to Send (RTS)/Clear to Send (CTS) Design in 5G," filed Mar. 15, 2018, which is hereby incorporated by reference in its entirety as though fully and completely set forth herein.

FIELD

The present application relates to wireless devices, and more particularly to apparatus, systems, and methods for reducing interference between radio access technologies.

DESCRIPTION OF THE RELATED ART

Wireless communication systems are rapidly growing in usage. There exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or WI-FI, and WIGIG), IEEE 802.16 (WIMAX), BLUETOOTH, and others. Further, wireless communication technology has evolved from voice-only communications to also include the transmission of data, such as Internet and multimedia content.

With the increasing number of wireless communication technologies in existence, it has become more common for wireless devices to include multiple antennas and/or multiple radios to implement various wireless communication technologies. Some standards (e.g., recent versions of IEEE 802.11ad and 802.11ay) use directional wireless techniques to improve system performance.

Further, interference and collisions between transmissions of one or multiple radio access technologies (RATs) are increasingly possible (e.g., in unlicensed spectrum). For example, collisions may be possible between transmissions, e.g., between 5G/cellular transmissions and wireless local area network (WLAN) transmissions. For example, collisions and interference may be due in part to the hidden node problem. Interference and collisions may degrade the wireless ecosystem and lead to negative impacts on users, e.g., of both RATs. Thus, improvements in the field are desired.

SUMMARY

Embodiments relate to apparatuses, systems, and methods to perform request to send (RTS) and clear to send (CTS) messaging, e.g., in a 5G environment. The RTS/CTS design may reduce or avoid collisions of transmissions (e.g., associated with a hidden node such as a WI-FI device) in unlicensed spectrum transmission mediums. The RTS and CTS messages may be transmitted in a single self-contained mini slot. The use of a self-contained mini slot may facilitate fast turn-around between the sender and receiver. The RTS/CTS design may provide for link adaptation and/or beamforming (e.g., including beam acquisition, tracking, management, direction, shape, etc.). For example, reference signals may be included in (or with) RTS/CTS. Multiple transmit and/or receive beams may be used to transmit/receive RTS/CTS in multiple symbols of the self-contained mini slot.

The techniques described herein may be implemented in and/or used with a number of different types of devices, including but not limited to base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings.

Figure 1:
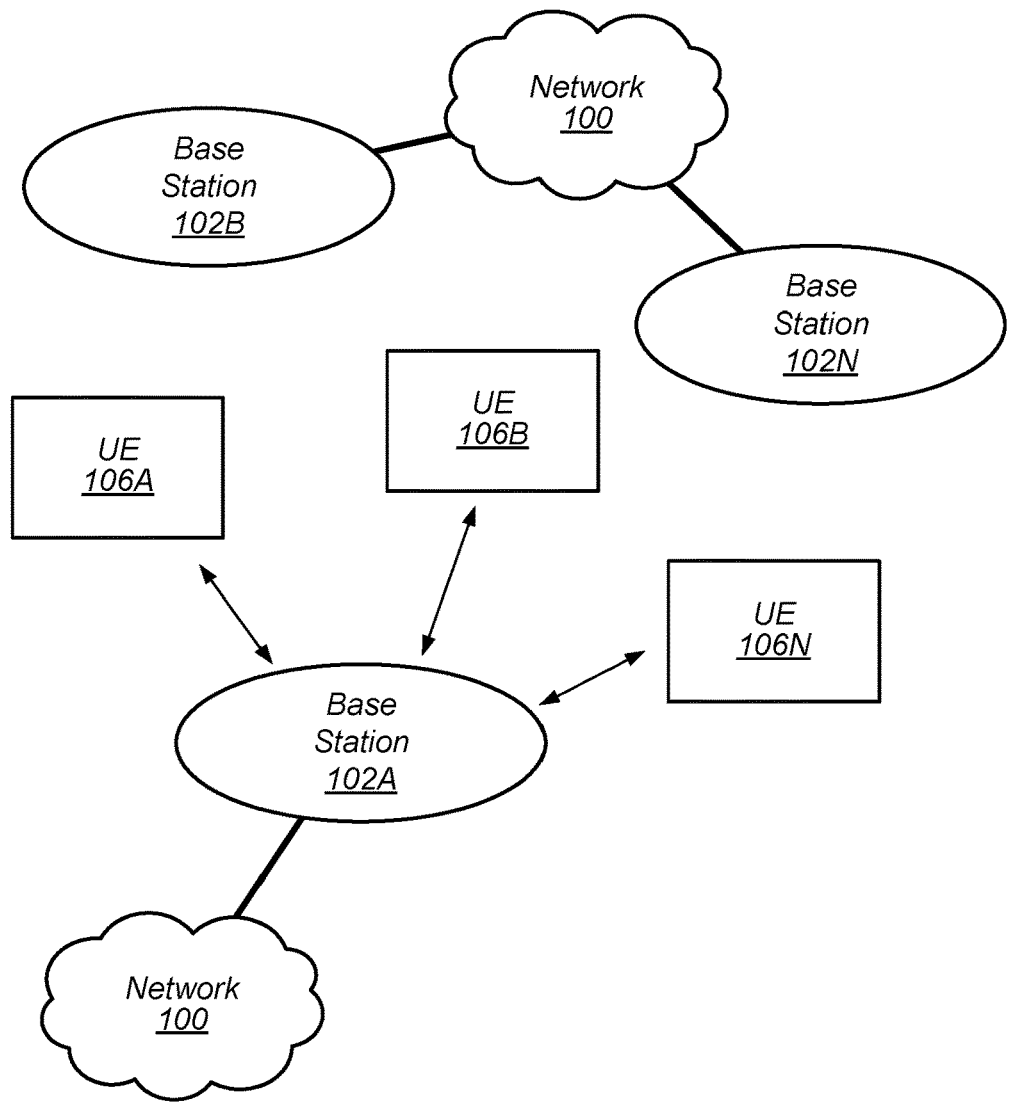
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication. A UE capable of operating according to 5G standards may be referred to as a new radio unit (NRU).

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while BLUETOOTH channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

IEEE 802.11—refers to technology based on IEEE 802.11 wireless standards such as 802.11a, 802.11.b, 802.11g, 802.11n, 802.11-2012, 802.11ac, 802.11ad, 802.11ay, and/or other IEEE 802.11 standards. IEEE 802.11 technology may also be referred to as "WI-FI" or "wireless local area network (WLAN)" technology.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
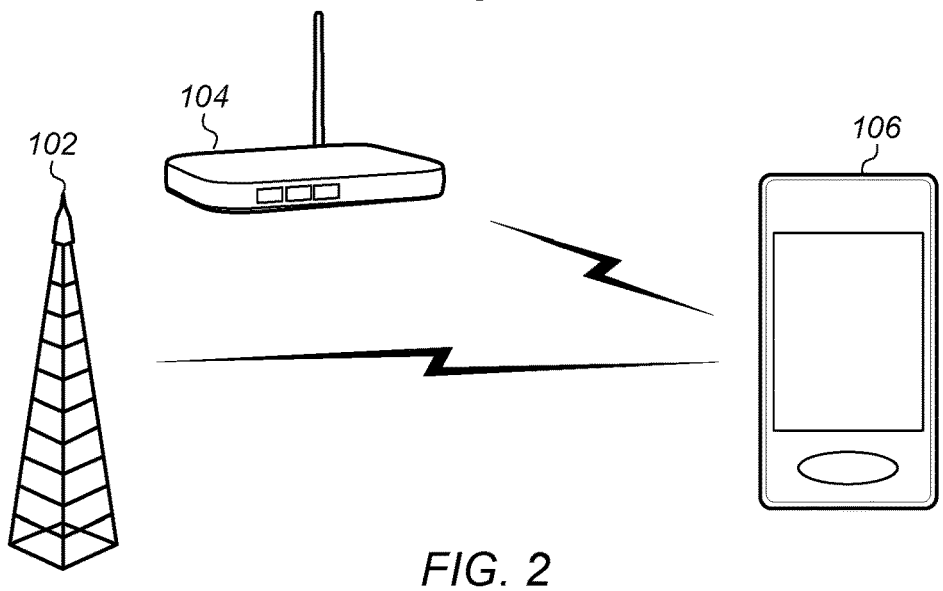
FIG. 2 illustrates a base station (BS) and an access point (AP) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE) or "new radio unit" (NRU). Thus, the user devices 106 are referred to as UEs, UE devices, or NRUs.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

In some embodiments, base station 102A may be (or may include) an access point (AP). The base station 102A may be capable of communicating using one or more wireless local area network (WLAN) communication standards. For example, the base station 102A may be capable of communicating using IEEE 802.11 standards (e.g., WI-FI).

Note that a UE 106 may be capable of communicating using multiple wireless communication standards. For example, the UE 106 may be configured to communicate using a wireless networking (e.g., WI-FI) and/or peer-to-peer wireless communication protocol (e.g., BLUETOOTH, WI-FI peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 and an access point 104, according to some embodiments. The UE 106 may be a device with cellular communication capability such as a mobile phone, a handheld device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of WI-FI and BLUETOOTH. Other configurations are also possible.

The access point 104 may be an access point providing a wireless local area network (WLAN). The access point 104 may be equipped to communicate with a network 100 (e.g., a wide area network (WAN), such as the Internet, among various possibilities). Thus, the access point 104 may facilitate communication between the UEs 106 and/or between the UEs 106 and the network 100. The access point 104 and the UEs 106 may be configured to communicate over the transmission medium using WI-FI, including any of various versions of IEEE 802.11 (e.g., a, b, g, n, ac, ad, ay, wake-up radio (WUR), etc.).

In some embodiments, the WLAN may be an ad hoc network, e.g., using Personal Basic Service Set (PBSS) architecture, e.g., as defined in IEEE 802.11 ad. In such cases, the role of access point 104 may be performed by a UE device (e.g., one of the UEs 106) acting as a PBSS Control Point (PCP). For convenience, the terms "access point" and "AP/PCP" may be used herein to include an access point or PCP.

Any or all of UE 106, AP 104, and/or BS 102 may be configured to operate according to the techniques disclosed herein. In particular, these devices may transmit and/or receive request to send and/or clear to send messages. Further, these devices may perform link adaptation and/or beamforming (e.g., including beam acquisition, tracking, management, direction, shape, etc.) based at least in part on such messages.

Figure 3:
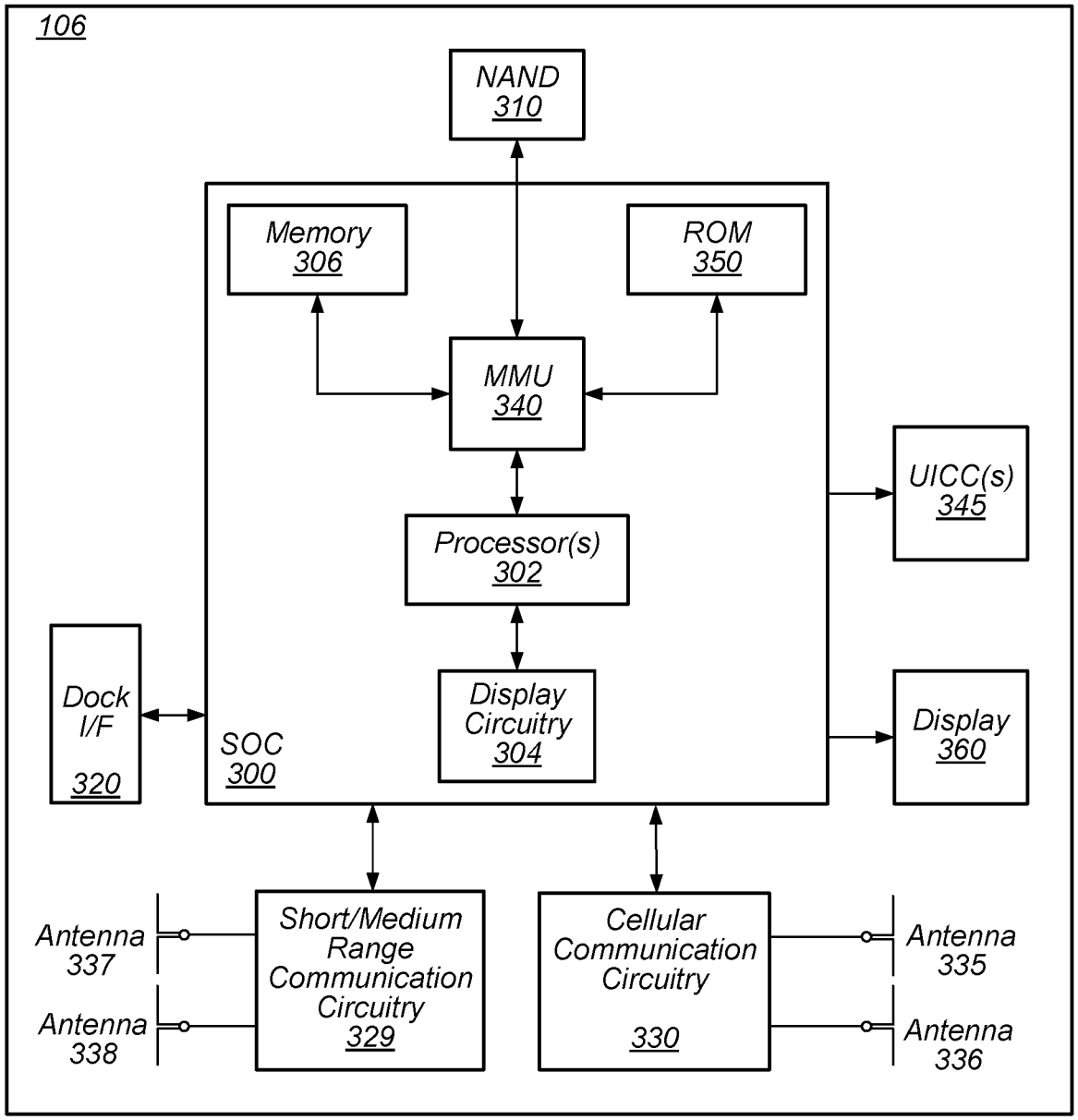
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a new radio unit (NRU), a mobile device or mobile station (STA), a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry (e.g., IEEE 802.11, WI-FI)). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The antennas may be grouped into any number of antenna arrays, each containing any number of antennas. The short to medium range wireless communication circuitry 329 may also couple (e.g., communicatively; directly or indirectly) to one or more antennas, such as antennas 337 and 338 as shown, which may also be grouped into antenna arrays. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Any of the processing elements (e.g., processors) 302 and/or processors associated with cellular communication circuitry 330 and/or short range wireless communication circuitry 329 may be configured to cause the wireless device to perform any or all of the various method elements or features described herein.

Figure 4:
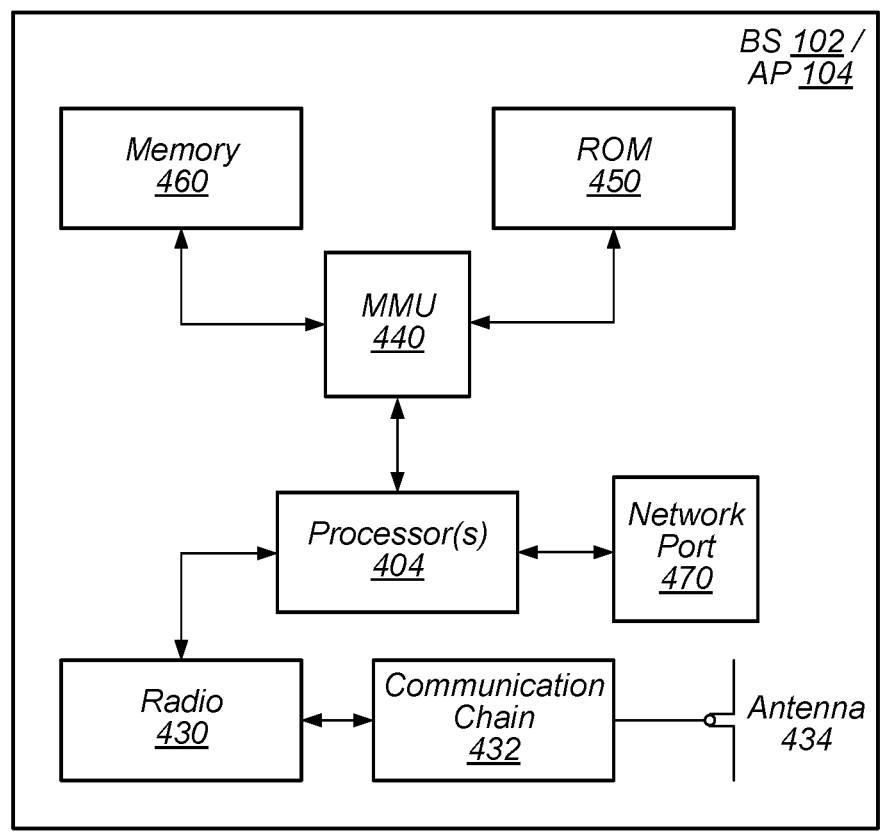
FIG. 4 illustrates an example block diagram of a BS/AP according to some embodiments.

FIG. 4—Block Diagram of a Base Station/Access Point

FIG. 4 illustrates an example block diagram of a base station 102/access point 104, according to some embodiments. For convenience, the term base station is used for the remainder of the description of FIG. 4. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a network (e.g., a telephone network and/or the internet) and provide a plurality of devices, such as UE devices 106, access to the network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, WI-FI, etc.

The base station (BS) 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and WLAN/Wi-Fi, LTE and WLAN/WI-FI, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430. Further, any processing elements associated with 430 may be configured to implement or support implementation of part or all of the features described herein.

Figure 5:
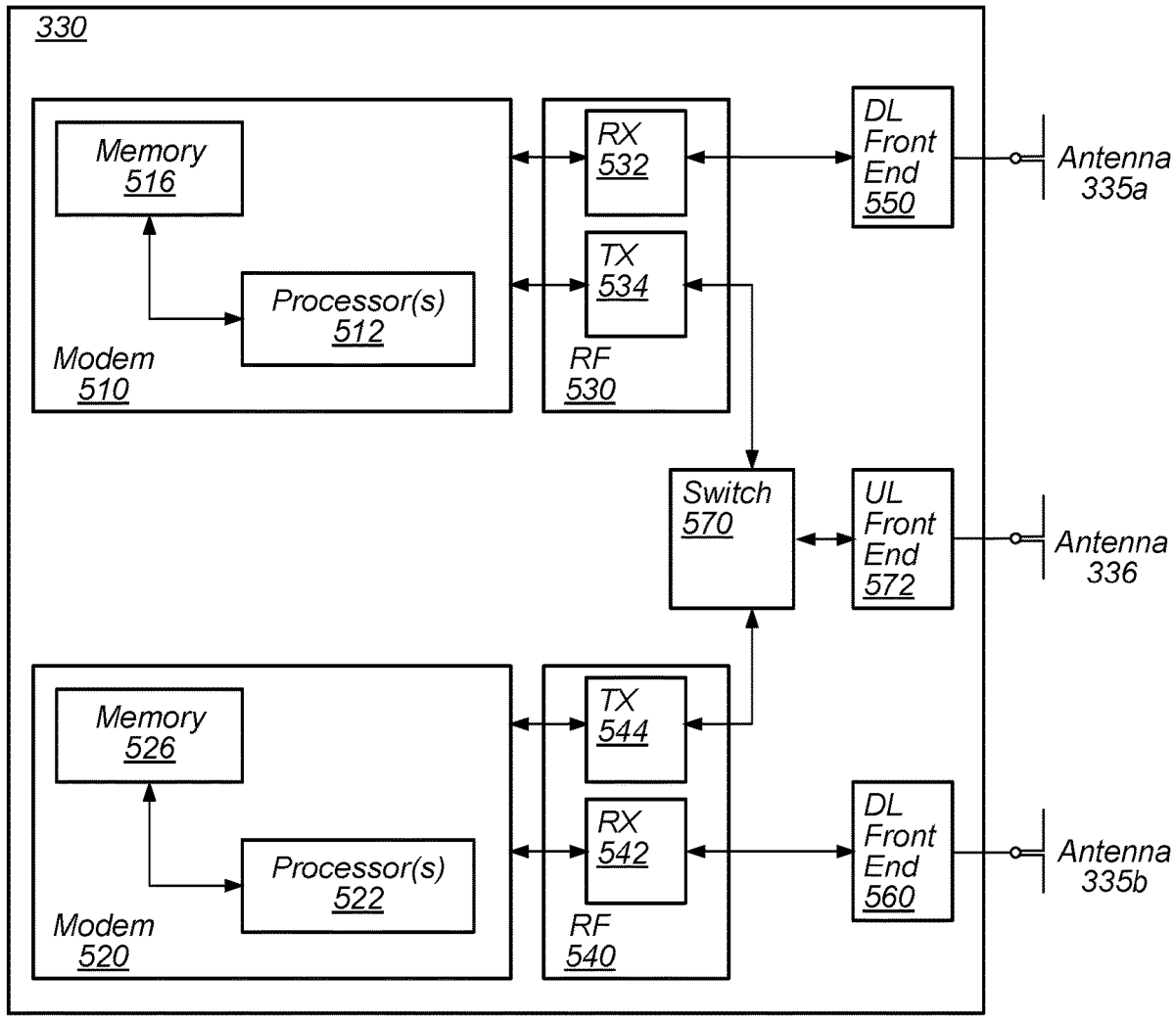
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106, BS 102, or AP 104, described above. As noted above, communication device 106 may be a user equipment (UE) device, NRU, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). Any number of antennas may be included in each of one or more antenna arrays. An antenna switch block (not shown) may be included to switch between antennas and/or antenna arrays. Multiple antennas may be used for single or multiple spatial streams (e.g., directional streams or beams for transmitting or receiving, e.g., Tx or Rx beams). Thus, the wireless device may be able to communicate according to standards that include directional functionality (e.g., 5G). Similarly, the wireless device may also be able to implement directional multi-gigabit (DMG) or enhanced directional multi-gigabit (EDMG) functionality, such as IEEE 802.11 ad and ay. The device may use a plurality of different antenna patterns (e.g., within a single array or potentially multiple antenna arrays) to transmit/receive for different directional sectors/beams. The device may sweep through beams and attempt to select a preferred/best beam (e.g., that offers the best transmission/reception characteristics).

In some embodiments, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second RAT, wherein the second cell operates in a second system bandwidth. The first and second system bandwidth may be the same, they may be separate, or they may overlap. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s)

512, 522, etc. In addition, each integrated circuit may include circuitry (e.g., first circuitry, second circuitry, etc.) configured to perform the functions of processor(s) 512, 522, etc.

It will be appreciated that the illustrated circuitry is exemplary only. In some embodiments, (different numbers of modems, RF front ends, DL front ends, UL front ends, switches, and/or antennas are possible, and may be configured as desired.

Figure 6A:
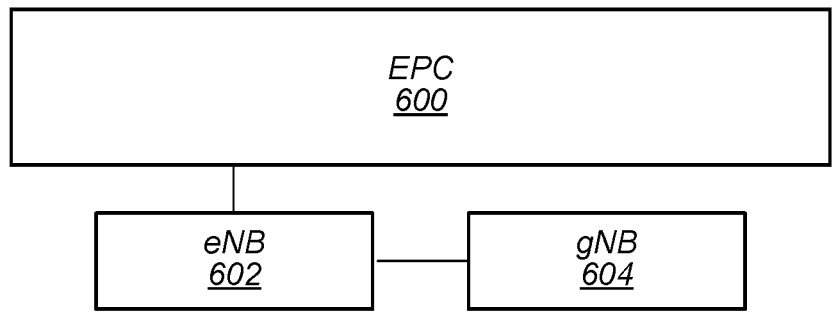
FIG. 6A illustrates an example of connections between an EPC network, an LTE base station (eNB), and a 5G NR base station (gNB), according to some embodiments.
Figure 6B:
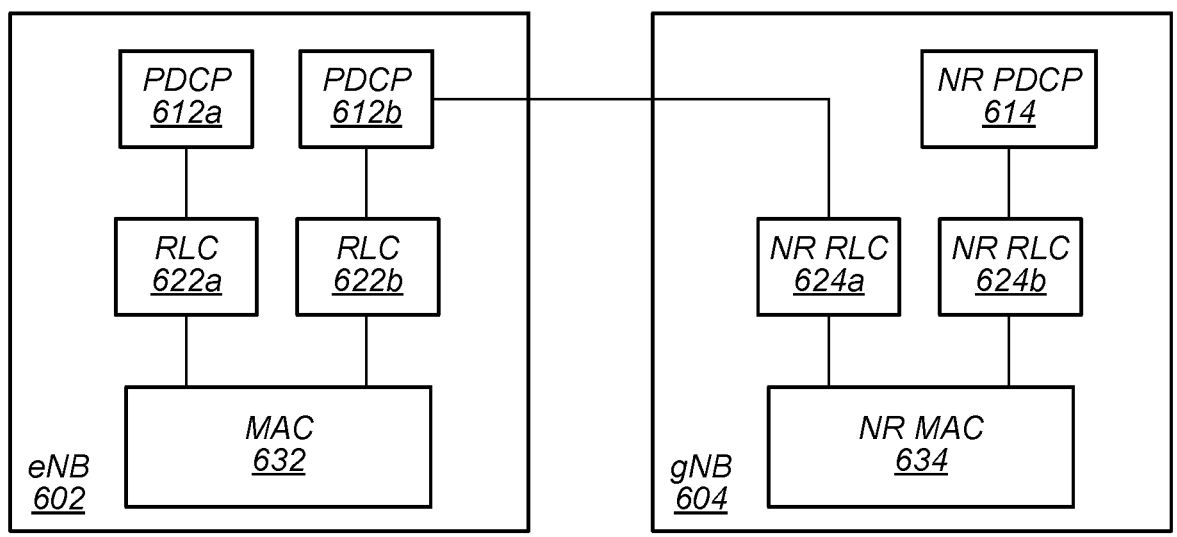
FIG. 6B illustrates an example of a protocol stack for an eNB and a gNB, according to some embodiments.

FIGS. 6A-6B: 5G NR Non-Standalone (NSA) Operation with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 622b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

In general, a non-stand alone (NSA) implementation employs dual connectivity in both uplink (UL) and downlink (DL). In other words, dual connectivity requires two active radio links in both UL and DL. In some implementations, depending on frequency band combinations, two (substantially) concurrent UL connections may cause receiver sensitivity degradation at the UE. For example, in some proposed implementations, a UE may be required to support 4 DL and 1 UL connection in LTE on bands 1 (UL: 1920-1980 MHz, DL: 2110-2170 MHz), 3 (UL: 1710-1785 MHz, DL: 1805-1880 MHz), 7 (UL: 2500-2570 MHz, DL: 2620-2690 MHz), and 20 (UL: 832-862 MHz, DL: 791-821 MHz) while (substantially) concurrently supporting 1 DL and 1 UL connection in NR at 3400-3800 MHz. In such implementations, a $5^{th}$ order intermodulation product (IM5) produced at a 5G NR transmitter of the UE from a $2^{nd}$ harmonic of LTE UL band 3 and NR UL may fall into LTE DL band 7 frequencies during (substantially) simultaneous UL operation. Similarly, a $4^{th}$ order harmonic of LTE UL band 20 and NR UL transmission may create a $5^{th}$ order intermodulation product that may interfere with LTE DL band 7 reception and thus desensitize a receiving for LTE DL band 7.

In addition, future specifications NR NSA may require a UE to support co-existence of LTE UL and NR UL within the bandwidth of an LTE component carrier and co-existence of LTE DL and NR DL within the bandwidth of an LTE component carrier. Further, such an implementation may be further required to minimize impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers. Note that such an implementation may also allow for (substantially) simultaneous operation on two or more UL carriers at a given time.

In some embodiments, a UE, such as communication device 106, may support LTE and NR co-existence on specific bands and/or frequencies. In addition, a UE may determine that for a band combination, UL sharing in NSA mode may be required to avoid receiver sensitivity degradation. Thus, the UE may need to inform the network that UL sharing mode will be used for the LTE/NR band combination. In some embodiments, a conditional field may be added to a UE capability message. The conditional field may indicate whether UL sharing mode will be used for the allocated band combination. In addition, the conditional field may indicate which bands/frequencies that the UE supports NSA operations. Note further that in some embodiments, e.g., as further described below, the UE may be configured to perform NSA operations via time division multiplexing (TDM). However, in other embodiments, the UE may be configured to perform NSA operations via other mechanisms such as frequency division multiplexing (FDM) or MAC layer multiplexing.

FIG. 7—Hidden Node

In some embodiments, WLAN and 5G may use the same or overlapping frequency resources. As a result, traffic on one RAT may interfere with traffic on another, and may therefore increase congestion. For example, cellular transmissions colliding with WLAN transmissions may lead to retransmissions on the WLAN network and therefore may increase congestion, e.g., on the WLAN network. Such collisions may downgrade (e.g., negatively impact) the wireless ecosystem and may harm the experience of the end users of both cellular and WLAN networks (e.g., a lose-lose situation). For example, WLAN transmissions may be polluted by the cellular transmissions, and WLAN users may experience more congestion and retransmission, among various possibilities. Cellular users may experience worse radio link conditions (e.g., lower signal-noise ratio (SNR) and/or lower channel quality index (CQI)), smaller transport block size (TBS), and higher congestion (e.g., higher time and/or frequency resource occupancy), among various possibilities.

Listen-before-talk (LBT) techniques may reduce the interference of cellular transmissions on WLAN networks in unlicensed spectrum (e.g., mmWave bands), under some conditions. LBT is a contention-based protocol, according to which a transmitter may listen (e.g., determine whether another device is transmitting) prior to initiating a transmission (e.g., talking). Thus the transmitter may wait for the medium (e.g., wireless medium, transmission medium) to be clear (e.g., for no other device to be transmitting on the medium) before beginning its transmission. LBT techniques may be applied inter-RAT (e.g., WLAN and cellular) or intra-RAT (e.g., between devices within a WLAN network or within a cellular network). LBT mechanics may be widely adopted for unlicensed spectrum sharing. However, in some embodiments, LBT techniques may be ineffective for solving the hidden node problem. The hidden node problem may exist either between RATs or within a single RAT.

The benefits of LBT may be most significant for WLAN networks that are close to a 5G BS (e.g., sharing the same medium, e.g. unlicensed spectrum). However, in some embodiments, LBT may be ineffective (e.g., relatively or completely) for WLAN networks that are further from the BS. For example, if there are 5G users in the coverage area of a WLAN network for which the 5G BS cannot monitor traffic (e.g., which may be referred to as a hidden node or hidden WLAN network), the cellular transmissions may cause congestion on the hidden WLAN network that the BS cannot avoid through LBT (e.g., because when the BS listens it may not detect the WLAN traffic). The maximum transmission power from a BS (e.g., including/plus beamforming gain) may generally be larger than the transmission power of a WLAN AP. In some embodiments, hidden WLAN networks may share a service set identifier (SSID) with a WLAN network that the BS can monitor.

In some embodiments, for NRUs/UEs (e.g., UE 106), base stations (e.g., BS 102), and access points (e.g., AP 104) that operate in sub-6 GHz spectrum, the hidden node problem may be similar to that of LTE licensed assisted access (LAA). However, for NRUs/UEs (e.g., UE 106), base stations (e.g., BS 102), and access points (e.g., AP 104) that operate in higher frequency bands (e.g., mmWave or millimeter wave bands), the hidden node problem may be more severe, e.g., under directional transmission with narrow Tx/Rx beams for high frequency with high-gain beamforming (e.g., as in 5G, in some embodiments). For example, the channel availability sensed by a transmitter may not match that sensed by a receiver. Further, in the case that an omni-directional antenna is used during carrier sensing, while a directional antenna is used for data transmission, additional differences may include: 1) the coverage/range of sensing and coverage/range of data transmission may be different (e.g., the coverage of the sensing area may be smaller), and 2) the likelihood of an exposed or hidden node may be higher.

In WLAN (e.g., WI-FI), request to send (RTS) and clear to send (CTS) messaging techniques may reduce (e.g., or help solve) the hidden node problem. However, current LTE LAA does not include an RTS/CTS design.

Figure 7:
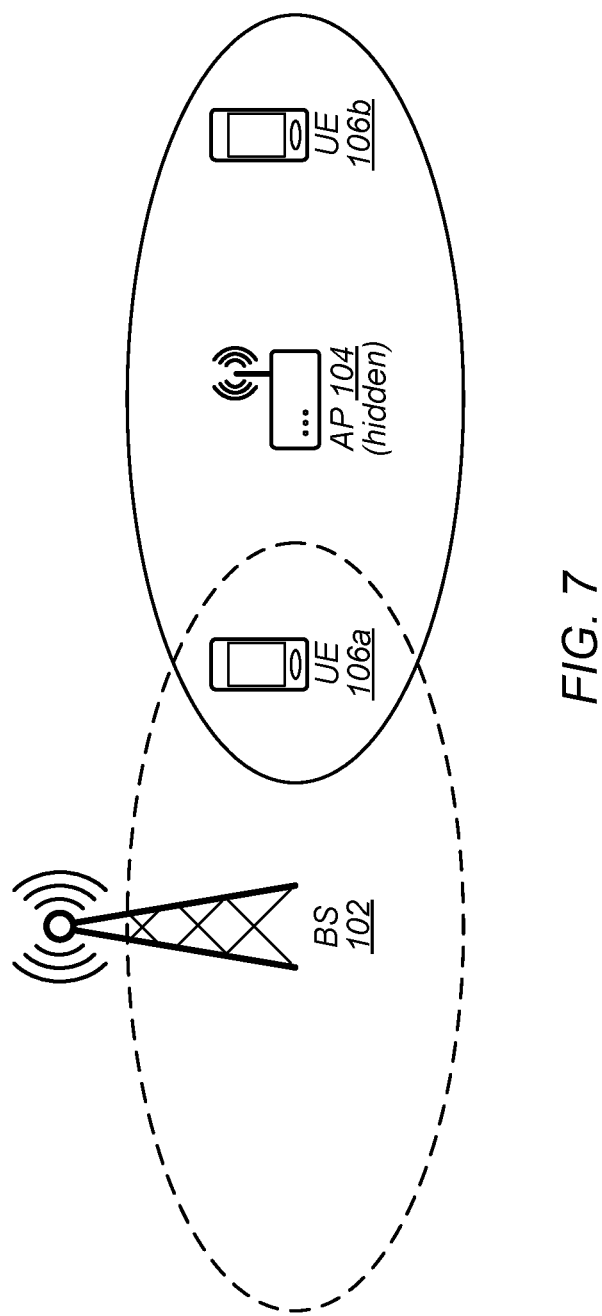
FIG. 7 illustrates a wireless communication environment and the hidden node problem, according to some embodiments.

FIG. 7 illustrates an exemplary case of the hidden node problem. As illustrated a gNB (e.g., BS 102) may be able to receive messages transmitted by UE 106*a*. However, the gNB may not be able to receive messages transmitted by an AP (e.g., AP 104) or UE 106*b*. Thus, AP 104 may be a hidden node. BS 102 may not detect transmissions of AP 104 and may transmit to UE 106*a*, e.g., using time/frequency resources also used by AP 104. As a result, collisions may occur. Note that, such transmissions of AP 104 may be directed to any device(s), e.g., they may or may not be to UE106*a*.

Due to the beamforming gain of transmissions by BS 102, the interference of the transmissions on the network (e.g., WLAN) of AP 104 may be significant. It will be appreciated that FIG. 7 is not a scale drawing and that the relative ranges of BS 102 and AP 104 may be different than shown. For example, the range of BS 102 may be larger than the range of AP 104, or vice versa.

Figure 8:
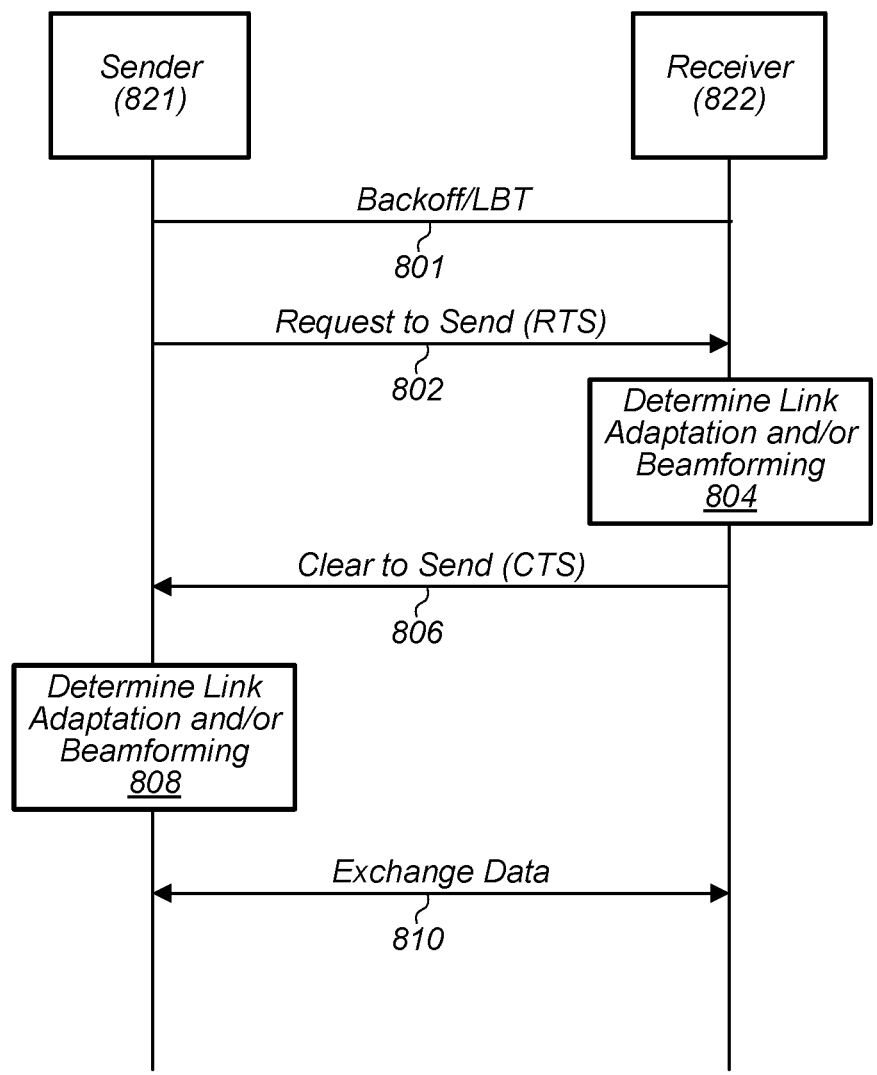
FIG. 8 illustrates a method for request to send (RTS) and clear to send (CTS) messaging, according to some embodiments.

FIG. 8—Request to Send (RTS) and Clear to Send (CTS) Messaging

FIG. 8 illustrates an exemplary sequence of RTS and CTS messages, according to some embodiments. In some embodiments, two devices (e.g., a UE 106 and a BS 102, two UEs, etc.) may exchange RTS and CTS messages. The devices may be capable of communication according to one or more 5G standards. For example, the devices may include an NRU and a gNB, among various possibilities. One device may be considered a sender (821) and the other may be considered a receiver (822), although it will be appreciated that such labels are illustrative only. For example, a device may perform the role of sender 821 at one time and perform the role of receiver 822 at another time. The RTS/CTS handshake messaging may avoid or reduce the occurrence of collisions or interference, e.g., related to the hidden node problem. The RTS and CTS messages may be cellular (e.g., 5G) transmissions. Referring to the illustrated case of FIG. 7, for example, an RTS/CTS handshake may avoid/reduce collisions of transmissions by sender 821 (e.g., BS 102) with transmissions of an AP (e.g., AP 104) which may be in range of receiver 822 (e.g., UE 106*a*).

Such messaging (e.g., RTS/CTS messaging) may also allow for link adaptation and/or beamforming in one or both directions (e.g., for transmissions from the sender 821 to the receiver 822 and/or from the receiver 822 to the sender 821). For example, the RTS and/or CTS messages may include or be associated with information or reference symbols useful for link adaptation and/or beam acquisition/management. Similarly, RTS and/or CTS messages may be transmitted and received using a sweep of Tx and/or Rx beams and information about beam selection may be included (e.g., in CTS).

In some embodiments, both the RTS and the CTS messages may be transmitted during (e.g., within) the same self-contained mini slot. A self-contained mini slot may represent a set of time and frequency resources used in 5G communications, and may include resources for two-way communication (e.g., a message and a response, e.g., an RTS and CTS). For example, a first message (e.g., an RTS) may be transmitted from a sender in a first symbol or symbols of the self-contained mini slot, and a receiver may transmit a response (e.g., a CTS) in a second one or more symbols of the self-contained mini slot. The use of a self-contained mini slot may facilitate fast turn-around between the sender and receiver.

Following a successful RTS/CTS handshake, the devices may exchange data (e.g., uplink and/or downlink, transmissions from the sender 821 to the receiver 822 and/or from the receiver 822 to the sender 821, etc.). Other users (e.g., other UE and/or network devices such as a neighbor BS or AP) which may detect or decode either the RTS or CTS may refrain from initiating transmissions in response to detecting the RTS/CTS.

RTS and CTS may be transmitted and described in terms of time and frequency resources. Such resources may or may not be scheduled by a gNB or other BS.

In time, the transmissions may be characterized as follows, in some embodiments. An RTS message and a responsive CTS message may be transmitted within a self-contained mini slot (e.g., both an RTS and corresponding CTS may be transmitted within the same mini slot). This sequence of messages in the same mini slot may facilitate fast turn-around times between the sender and receiver to check whether the communication link between them is available and may support proper communication. A small number of symbols (e.g., 2, for example, although other values are possible) within the self-contained mini slot may be used for RTS/CTS, which may allow the other symbols to be left empty and may thus minimize the potential interference addition to the existing wireless link(s). Multiple RTS/CTS may be spatially or frequency multiplexed on the same time axis to enable multiple communication pairs sensing (e.g., multiple pairs of devices concurrently performing RTS/CTS). In some embodiments, multiple (e.g., sequential) self-contained mini slots may be used for transmission of RTS and CTS. In some embodiments, other combinations or types of slots, frames, subframes, or symbols may be used.

In frequency, the transmissions may be characterized as follows, in some embodiments. RTS/CTS messages may use a small bandwidth part (BWP) (e.g., a subset of contiguous resource blocks on a carrier, the subset may be as small as possible/practical), which may limit the potential interference addition along the communication path(s). Large (e.g., or relatively larger) BWP may also be used in some embodiments. In some embodiments, RTS/CTS messages may use resource element (RE) rasters (e.g. one RE every N REs) to fulfill wideband transmission while limiting interference at the same time.

The RTS and/or CTS may include (e.g., or be transmitted with) additional information. Such information may be transmitted on various time and frequency resources. For example, RTS may include intended upcoming data transmission length (e.g. length of a transmit opportunity (TXOP)) and/or destination address. RTS may also contain downlink control information (DCI) and may specify (e.g., map) BWP information for upcoming data communication.

Further, channel state information reference signals (CSI-RS) may be inserted in or included together (e.g., piggybacked) with RTS and/or CTS messages in order to perform uni-directional or bi-directional link adaption. The RTS target (e.g., receiver 822) may perform CSI-RS measurement and send back link adaption parameters (e.g. CQI, Rank etc.) in or with a CTS message. The receiver 822 may in turn include CSI-RS in or with the CTS to enable the sender 821 to perform link adaptation. In other words, the RTS sender 821 may perform link assessment based on CSI-RS, which may be piggybacked with CTS messages sent by CTS sender (e.g., receiver 822). Thus, both sender 821 and receiver 822 may transmit CSI-RS to allow the other party to perform link adaptation, in some embodiments. Moreover, each party (e.g., sender 821 and receiver 822) may transmit link adaptation parameters to the other party in response to measurements of the CSI-RS. In some embodiments, other types of reference signals may be used, e.g., for link adaptation.

In some embodiments, the RTS/CTS messaging design may include (e.g., embedded) beamforming (e.g., beam acquisition and/or tracking) capability. Beamforming may be important for directional communication techniques, e.g., for transmission in mmWave spectrum. A self-contained mini slot may have configuration with more than 2 symbols, e.g., 12 symbols, for example. If more than 1 symbol is scheduled in the mini slot configuration, different Tx beams, quasi-collocation (QCL), and/or CSI-RS may be used for different symbols to transmit RTS so that different Tx beams can be evaluated at the receiver 822. In other words, sender 821 may transmit the same RTS multiple times using different Tx beams (e.g., possibly with different QCL indications and/or different CSI-RS). If more than one symbol is scheduled for RTS with the same Tx beam, the receiver 822 may also switch Rx beams (e.g., for the same Tx beam in different symbols) so that receiver 822 may evaluate/track different Rx beams. In some embodiments, Tx and Rx beam tracking may be limited to neighbor beams (e.g., beams that may be sufficiently similar for the devices to switch between beams in the time available). The transmission configuration indicator (TCI) offset of neighbor beams may be specified through RRC and/or MAC-CE messages. TCI may be included in/with RTS/CTS messages in order to identify the beam(s) used to transmit the RTS/CTS messages.

FIG. 8 is a communication flow diagram illustrating one such method for two devices in communication, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 8 may be implemented by devices, such as a UE 106 and BS 102 illustrated in and described with respect to FIGS. 1-6, or more generally in conjunction with any of the computer circuitry, systems, devices, elements, or components shown in the Figures herein, among other devices, as desired. For example, a processing element (e.g., 302, 404, 512, 522, any processing elements associated with wireless circuitry or a radio, etc.) may be configured to cause a UE, base station, network element, access point, etc. to perform any of the illustrated method elements, among various possibilities. Although aspects of the method of FIG. 8 are described with respect to communications using WLAN and cellular RATs, it will be appreciated that these RATs are exemplary only and that the methods may be applied to any combination of RATs. Further, the method may be applied to larger numbers of RATs (e.g., three or more RATs). Further, the method may be applied to larger numbers of devices (e.g., three or more devices). As shown, the method may operate as follows.

Sender 821 (e.g., and also Receiver 822) may wait for a backoff/LBT period (801). The duration of the backoff/LBT period may be configured according to a wireless standard (e.g., a 5G standard) or may be configured as desired. Sender 821 may determine that the medium (e.g., one or more relevant frequency bands, such as mmWave bands) is clear for at least the duration of the backoff/LBT period. Sender 821 may use any form of sensing and/or any desired beam(s) to detect transmissions on the medium and to determine that the medium is clear. Sender 821 may use a timer or timers to determine that the medium remains clear for the duration of the backoff/LBT period. If sender 821 detects any transmissions on the medium, it may restart the backoff/LBT period (e.g., reset a backoff timer).

Receiver 822 may similarly use any sensing technique(s) and/or beam(s) to determine whether the medium (e.g., a first medium) is clear and may also use timers to determine that the medium remains clear for the duration of a backoff/LBT period. Receiver 822 may detect transmissions that sender 821 may not detect, e.g., receiver 822 may detect transmissions from a node that is hidden from sender 821. Such transmissions may or may not be directed to or successfully decoded by receiver 822. For example, such transmissions may be WLAN transmissions (e.g., on a network provided by AP 104, as illustrated in FIG. 7, among various possibilities) or cellular transmissions, among other possibilities.

Either or both of sender 821 and receiver 822 may send, receive, and/or detect transmissions with another device during the backoff/LBT period. For example, such transmissions may be performed on a separate medium, a different RAT, and/or using different spatial resources (e.g., in a different direction). In some embodiments, such transmissions may not interfere with transmissions between sender 821, receiver 822, and/or other devices (e.g., AP 104), e.g., on the first medium. Therefore, such transmissions may not lead to a determination that the first medium is not clear, according to some embodiments.

Sender 821 may transmit an RTS (802). The RTS may be transmitted after sender 821 has determined that the medium (e.g., the first medium) is clear for the LBT/backoff period. The RTS may be transmitted in one or more symbols of a self-contained mini slot.

The RTS may be designed to support link adaptation and/or beamforming. For example, the RTS may be transmitted one or more times (e.g., in multiple symbols of the self-contained mini slot) and may use one or more beams (e.g., sequentially, e.g., a different beam for each symbol or each group of multiple groups of symbols). The RTS may be transmitted with additional information, such as CSI-RS (e.g., such information may be included in the RTS or associated with the RTS).

The RTS may be transmitted with information about a requested transmission, such as bandwidth, location of bandwidth, BWP, duration, and/or destination.

Receiver 822 may receive and decode the RTS. Receiver 822 may take any number of measurements of, or related to, the RTS. For example, receiver 822 may measure or determine signal strength (e.g., reference signal strength indicator (RSSI)), channel quality indicator (CQI), beam direction (e.g. optimal beam pair for communication), signal quality (e.g., reference signal received quality (RSRQ)), signal-to-noise ratio (SNR), signal to interference and noise ratio (SINR), etc. of the RTS and/or any CSI-RS.

Receiver 822 may determine link adaptation information and/or beamforming information (804). For example, based on any CSI-RS that is transmitted with the RTS, the receiver 822 may determine link adaptation parameters, e.g., a preferred modulation and coding scheme, rank, PMI, or transmit power.

Similarly, if sender 821 used multiple Tx beams or QCL to transmit RTS (and/or CSI-RS), the receiver 822 may determine a preferred Tx beam of sender 821 (e.g., based on RSSI or other measurements taken by receiver 822 during each symbol that sender 821 transmitted the RTS). Further, receiver 822 may use multiple Rx beams to receive the RTS and associated information. If receiver 822 used multiple Rx beams or QCL to receive RTS and/or CSI-RS, receiver 822 may evaluate Rx beam tracking and may determine one or multiple preferred Rx beams (e.g., of receiver 822).

Receiver 822 may transmit a CTS to sender 821 (806). The CTS may be transmitted in one or more symbols of the same self-contained mini slot as the RTS. Receiver 822 may determine that the medium is clear. Such a determination may be based on sensing/measurements performed during, prior to, and/or subsequent to the backoff/LBT period 801. If the medium is not clear, receiver 822 may not transmit a CTS.

The CTS may be designed to support link adaptation and/or beamforming. For example, the CTS may be transmitted one or more times (e.g., in multiple symbols of the self-contained mini slot) and may use one or more beams (e.g., sequentially, e.g., a different beam for each symbol or each group of multiple groups of symbols). The CTS may be transmitted with additional information, such as CSI-RS.

The CTS may be transmitted with an indication (e.g., or indications) of any link adaptation and/or beamforming parameters determined by receiver 822. For example, the CTS may include or be transmitted with indications of requested modulation and coding scheme, rank, precoding matrix indicator (PMI), requested transmit power, preferred Tx beam, and/or preferred Rx beam. In some embodiments, such indications may be transmitted separately.

Sender 821 may receive and decode the CTS. Sender 821 may take any number of measurements of, or related to, the CTS. For example, sender 821 may measure or determine signal strength (e.g., RSSI), CQI, signal quality (e.g., RSRQ), SNR, SINR, etc. of the CTS and/or any CSI-RS.

Sender 821 may determine link adaptation and/or beamforming (808). For example, based on any CSI-RS that is transmitted with the CTS, the sender 821 may determine link adaptation parameters, e.g., a preferred modulation and coding scheme, and/or rank, and/or PMI, and/or transmit power.

Similarly, if receiver 822 used multiple Tx beams or QCL to transmit CTS (and/or CSI-RS), the sender 821 may determine one or multiple preferred Tx beams (e.g., based on RSSI or other measurements). Further, if sender 821 used multiple Rx beams or QCL to receive CTS and/or CSI-RS, sender 821 may evaluate Rx beam tracking and may determine one or multiple preferred Rx beams.

Sender 821 and receiver 822 may exchange data (810). The period of time of the data exchange may be referred to as a data communication stage, and may include one or more slots (e.g., self-contained mini slots).

In some embodiments, during the data communication stage, sender 821 may (e.g., additionally or alternatively) transmit data to a different device (e.g., other than receiver 822), e.g., as indicated by destination information sent with the RTS. For example, sender 821 may transmit data to another device on a network associated with or provided by receiver 822.

Sender 821 and receiver 822 may use/implement any link adaptation and/or beamforming parameters or information determined previously. The exchange of data may also be performed using any additional information (e.g., TXOP, duration, BWP, etc.) indicated by (e.g., or with) the RTS and/or CTS. The exchange of data may include transmissions from the sender 821 to the receiver 822. In some embodiments, data may also be transmitted from the receiver 822 to the sender 821.

Sender 821 and receiver 822 may initiate a next data cycle, e.g., may start a new backoff/LBT period in response to one device having data to transmit to the other device. Any number of data cycles may occur between the devices.

Either or both of the devices may also participate in any number of data cycles with other devices.

Figure 9:
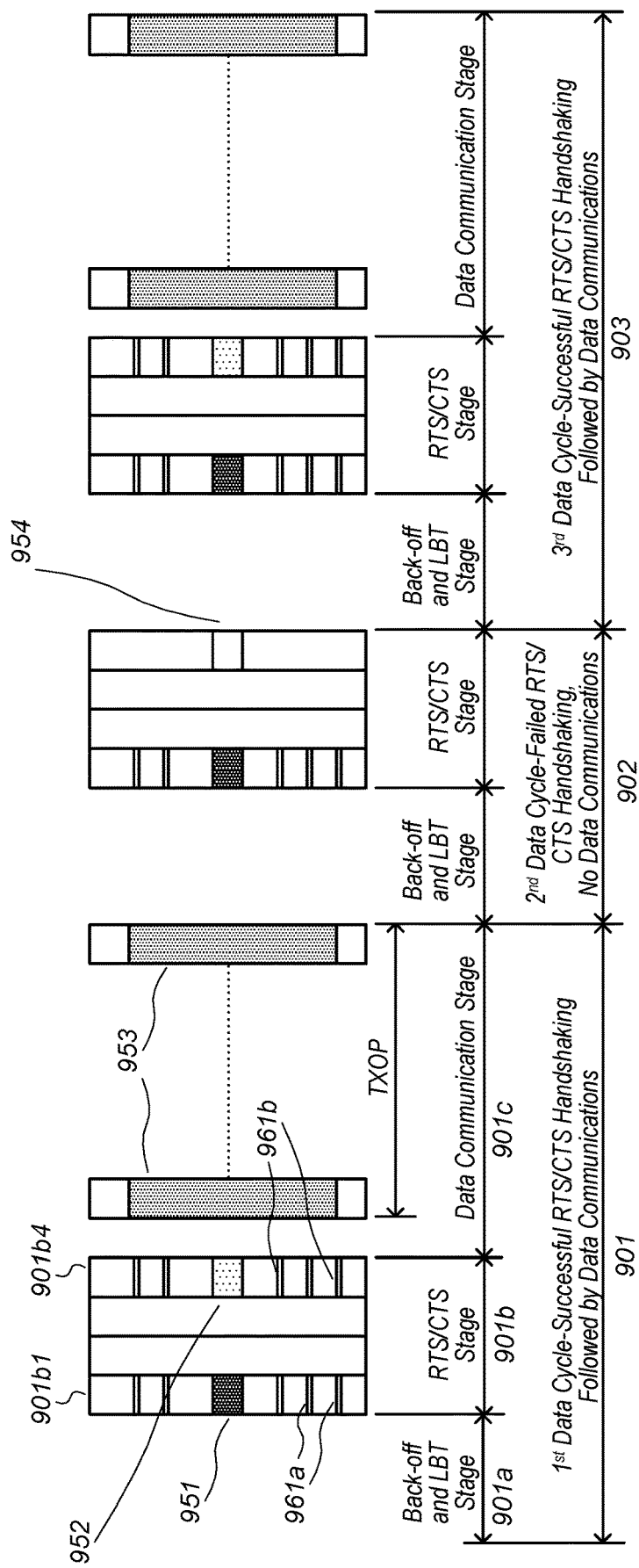
FIGS. 9 and 10 illustrate exemplary sequences of RTS and CTS messaging, according to some embodiments.
Figure 10:
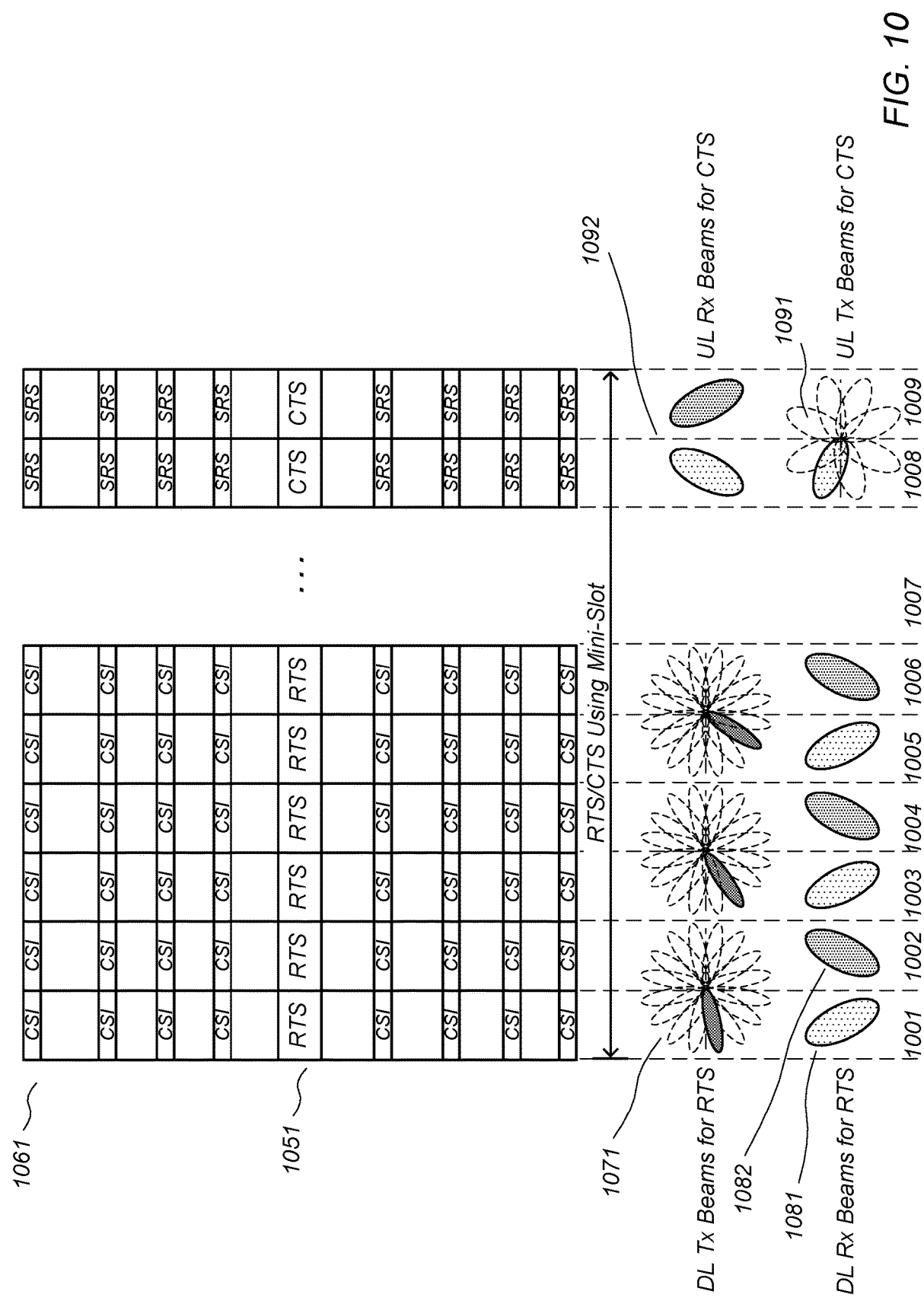

FIGS. 9 and 10—Exemplary RTS/CTS Sequences

FIG. 9 is a time/frequency diagram illustrating an exemplary sequence of RTS/CTS messages. Time is illustrated on the horizontal access and frequency on the vertical axis.

During a 1$^{st}$ data cycle (901), the devices may first wait a back-off and LBT stage (901*a*).

During an RTS/CTS stage (901*b*), the sender (e.g., 821) may transmit an RTS (951) during a first symbol (901*b*1), the sender and receiver (e.g., 822) may wait two symbols (e.g., empty symbols), and the receiver may transmit a CTS (952) during a fourth symbol (901*b*4). The RTS/CTS stage (901*b*) may be a self-contained mini slot. The RTS and CTS may each be transmitted using small BWP (e.g., the same BWP as illustrated, or different BWPs). The RTS may contain information (e.g., BWP, duration, destination, etc.) for a data communication stage. CSI-RS (961*a*, 961*b*) may be transmitted concurrently (e.g., using different frequency resource elements than the RTS/CTS) with either or both of the RTS/CTS (e.g., during symbols 901*b*1 or 901*b*4, respectively). Note that both symbols 901*b*1 and 901*b*4 illustrate CSI-RS 961 (a and b, respectively) at five frequency locations; however any number of frequency locations may be used for CSI-RS. Either or both of the sender and/or receiver may determine link adaptation and/or beamforming based on the RTS, CTS, and/or CSI-RS.

Following the RTS/CTS stage, the devices may exchange data in a data communication stage (901*c*). The sender and receiver may implement any link adaptation and/or beamforming parameters determined based on the RTS, CTS, and/or CSI-RS. The data communication stage may include a TXOP. The sender may use a large BWP (953) to transmit data. At the conclusion of the data communication stage, the devices may switch back to small BWP for next CTS/RTS stage.

During a second data cycle (902), the devices may first wait a back-off and LBT stage. During an RTS/CTS stage, the sender may transmit an RTS during a first symbol, the sender and receiver may wait two symbols, and no CTS (954) may be received by the sender during a fourth symbol. For example, the receiver may not transmit a CTS because it may determine that the medium is not clear. Based on not receiving a CTS, the sender may determine that the medium is not clear for data communications (e.g., a failed RTS/CTS handshake). Thus, the devices may conclude the second data cycle, e.g., without a data communication stage. CSI-RS may or may not be transmitted by the receiver or received by the sender during the fourth symbol of the RTS/CTS stage.

During a third data cycle (903), the devices may again successfully perform an RTS/CTS handshake and may proceed to communicate data, e.g., as illustrated in and described with respect to the first cycle (901).

It will be appreciated that the sequence of FIG. 9 is exemplary only. Other numbers of data cycles and other patterns of successful vs. failed RTS/CTS handshakes are possible according to embodiments.

FIG. 10 is a time/frequency diagram illustrating an exemplary sequence of RTS/CTS messages. Time is illustrated on the horizontal access and frequency on the vertical axis. Tx and Rx beams are illustrated.

A mini slot may be configured with 6 symbols (1001-1006) for downlink (e.g., RTS) and 2 symbols (1008-1009) for uplink (e.g., CTS). It will be appreciated that the directions may be reversed (e.g., downlink may correspond to CTS). Any number of symbols (e.g., zero or more) may occur between the RTS and CTS symbols (1007).

The RTS sender may sweep 3 Tx beams and the RTS receiver may sweep 2 Rx beams during the 6 RTS symbols. As shown, during the first two symbols (1001-1002), the sender may transmit RTS on a (e.g., small) BWP (1051), and may use a first Tx beam (1071). The sender may also transmit CSI-RS using one or more other BWPs (1061) at the same time. The receiver may use a first Rx beam (1081) during the first symbol (1001) and a second Rx beam (1082) during the second symbol (1082). During the next two symbols, the sender may continue to transmit RTS and CSI-RS (e.g., using the same or different BWPs), using a second Tx beam. During the next two symbols, the sender may use a third Tx beam. The receiver may continue alternating between the first and second Rx beams for the third to sixth symbols. The receiver may determine which of the two Rx beams and which of the three Tx beams provide the best directional communication link characteristics (e.g., beamforming). The receiver may also determine link adaptation based on measurements of the RTS and/or CSI-RS.

During the CTS symbols (1008-1009), the receiver may transmit the CTS (and possibly reference signals, e.g., sounding reference signals (SRS)) using a Tx beam (1091) that corresponds to the determined Rx beam with the best characteristics. The receiver may further send information (e.g., TCI) to the sender identifying the Tx beam (e.g., of the sender) that the receiver determined provided the best characteristics. The sender may sweep through two (e.g., or any number of) Rx beams (1092), and may thus gather additional beamforming information. It will be appreciated that both the sender and the receiver may perform beam sweeps using any number of beams during the CTS symbols (e.g., as illustrated for the RTS symbols 1001-1006, among various possibilities). Additional CTS symbols may be used to support such beam sweeps, according to some embodiments. The additional beamforming information gathered during the CTS symbols may allow for better beamforming, e.g., in the case that beam reciprocity is not achieved. The sender may transmit the additional beamforming information gathered during the CTS symbols to the receiver.

In the following, exemplary embodiments are provided.

In one set of embodiments, a method for operating a wireless device may comprise: at the wireless device, during a self-contained mini slot: receiving a request to send (RTS) from a second device during a first one or more symbols of the self-contained mini slot; in response to receiving the RTS, determining that a wireless medium associated with the RTS is clear; determining at least one of link adaptation information and beamforming information, wherein said determining is based on the RTS; and in response to determining that the wireless medium associated with the RTS is clear, transmitting a clear to send (CTS) to the second device during a second one or more symbols of the self-contained mini slot, wherein the CTS comprises an indication of the at least one of link adaptation information and beamforming information.

In some embodiments, the RTS may comprise CSI-RS, wherein the at least one of link adaptation information and beamforming information comprises a modulation and coding scheme.

In some embodiments, the method may further comprise: measuring signal strength of the CSI-RS, wherein the modulation and coding scheme is based at least in part on the signal strength of the CSI-RS.

In some embodiments, said receiving the RTS, may comprise using multiple Rx beams to receive the RTS, wherein the at least one of link adaptation information and beamforming information comprises a preferred Rx beam.

In some embodiments, the method may further comprise: taking measurements during each of the first one or more symbols of the self-contained mini slot; wherein the at least one of link adaptation information and beamforming information comprises a preferred Tx beam, wherein the preferred Tx beam is based on the measurements.

In some embodiments, the method may further comprise: receiving data from the second device, using the at least one of link adaptation information and beamforming information.

In another set of embodiments, an apparatus may comprise a processing element and may be configured to cause a wireless device to: receive a request to send (RTS) from a second device during a first one or more symbols of a self-contained mini slot, wherein the RTS is received on a wireless medium; determine that the wireless medium is clear; transmit a clear to send (CTS) to the second device during a second one or more symbols of a self-contained mini slot, wherein transmitting the CTS is in response to receiving the RTS and determining that the wireless medium is clear.

In some embodiments, the RTS may be received in a first small bandwidth part, and the CTS may be transmitted in a second small bandwidth part.

In some embodiments, the second small bandwidth part may be the same as the first small bandwidth part.

In some embodiments, the CTS may support link adaptation.

In some embodiments, the CTS may support beamforming.

In another set of embodiments, a method for operating a wireless device may comprise: at the wireless device, during a self-contained mini slot: transmitting a request to send (RTS) and channel state information reference signals (CSI-RS) to a second device; and receiving a clear to send (CTS) from the second device, wherein the CTS comprises link adaptation information based on the CSI-RS; and after the self-contained mini slot, transmitting data to the second device, wherein said transmitting is in response to receiving the CTS and utilizes the link adaptation information.

In some embodiments, the transmission medium may comprise unlicensed spectrum.

In some embodiments, the RTS may be a 5G transmission and/or the CTS may be a 5G transmission.

In some embodiments, the method may further comprise: determining that a transmission medium is clear, wherein said transmitting the RTS is based on determining that the transmission medium is clear.

In some embodiments, the CSI-RS may be transmitted at the same time as the RTS and on a different frequency than the RTS.

In another set of embodiments, an apparatus may comprise a processing element and may be configured to cause a wireless device to: determine that a transmission medium is clear; transmit a request to send (RTS) to a second device during first symbols of a self-contained mini slot, wherein transmitting the RTS is based on the determination that the transmission medium is clear; receive a clear to send (CTS) from the second device during one or more second symbols of a self-contained mini slot; and transmit data to the second device using the beamforming information in response to the CTS.

In some embodiments, the RTS may comprise information about a requested transmission, wherein the data is transmitted to the second device according to the information about the requested transmission.

In some embodiments, the wireless device may transmit the RTS using multiple beams, wherein the wireless device sequentially transmits the RTS using each of the multiple beams for one or more of the first symbols, wherein the CTS comprises beamforming information.

In another set of embodiments, an apparatus may comprise a processing element and may be configured to cause a wireless device to: during a self-contained mini slot: transmit a request to send (RTS) to a second device during a first one or more symbols of the self-contained mini slot; receive a clear to send (CTS) from the second device during a second one or more symbols of the self-contained mini slot; and determine one or more of link adaptation and beamforming information; and after the self-contained mini slot, exchange data with the second device in response to the CTS and using the one or more of link adaptation and beamforming information.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. An apparatus, comprising:
a processor configured to cause a 5G NR cellular wireless device to:

receive a request to send (RTS) and reference signals associated with the RTS from a second device during a first one or more symbols of a self-contained mini slot, wherein the self-contained mini-slot is a time interval including time resources for both the RTS and a clear to send (CTS), wherein the RTS is received in a wireless medium, wherein the reference signals associated with the RTS are received using frequency resource elements in the wireless medium different than the RTS, wherein the RTS and the reference signals associated with the RTS are at least one of: transmitted with multiple transmit (Tx) beams and/or received with multiple receive (Rx) beams;

determine, in response to receiving the RTS, whether the wireless medium is clear;

determine, based on the reference signals associated with the RTS, at least one of link adaptation information or beamforming information; and transmit, in response to determining that the wireless medium associated with the RTS is clear, the CTS to the second device during a second one or more symbols of the self-contained mini slot, wherein the CTS comprises an indication of the at least one of link adaptation information or beamforming information.

2. The apparatus of claim 1,
wherein the reference signals associated with the RTS comprise channel state information reference signals (CSI-RS),
wherein the at least one of link adaptation information or beamforming information comprises a modulation and coding scheme.

3. The apparatus of claim 2, the processor further configured to cause the wireless device to:
measure signal strength of the CSI-RS,
wherein the modulation and coding scheme is based at least in part on the signal strength of the CSI-RS.

4. The apparatus of claim 1,
wherein to receive the RTS, comprises using multiple Rx beams to receive the RTS,
wherein the at least one of link adaptation information or beamforming information comprises a preferred Rx beam.

5. The apparatus of claim 1, the processor further configured to cause the wireless device to:
take measurements during each of the first one or more symbols of the self-contained mini slot;
wherein the at least one of link adaptation information or beamforming information comprises a preferred Tx beam, wherein the preferred Tx beam is based on the measurements.

6. The apparatus of claim 1, the processor further configured to cause the wireless device to:
wait at least one symbol between receiving the RTS and transmitting the CTS.

7. The apparatus of claim 1,
wherein the RTS is received in a first bandwidth part,
wherein the CTS is transmitted in a second bandwidth part.

8. The apparatus of claim 7,
wherein the second bandwidth part is the same as the first bandwidth part.

9. The apparatus of claim 1,
wherein the CTS is transmitted with multiple Tx beams.

10. The apparatus of claim 1,
wherein the CTS is transmitted with reference signals transmitted at the same time as the CTS.

11. A method for operating a 5G NR cellular wireless device, the method comprising:
at the wireless device, during a self-contained mini slot, wherein the self-contained mini-slot is a time interval including time resources for both a request to send (RTS) and a clear to send (CTS):
transmitting the RTS and channel state information reference signals (CSI-RS) to a second device, wherein the CSI-RS are transmitted using frequency resource elements in an unlicensed spectrum different than the RTS, wherein the RTS and the CSI-RS are at least one of: transmitted with multiple transmit (Tx) beams and/or received with multiple receive (Rx) beams; and
receiving a clear to send (CTS) from the second device, wherein the CTS comprises link adaptation information based on the CSI-RS; and
at the wireless device, after the self-contained mini slot, transmitting data to the second device, wherein said transmitting is in response to receiving the CTS and utilizes the link adaptation information.

12. The method of claim 11,
wherein the link adaptation information comprises a requested transmit power.

13. The method of claim 11,
wherein the RTS is a 5G transmission,
wherein the CTS is a 5G transmission.

14. The method of claim 11,
wherein the CSI-RS is transmitted at the same time as the RTS.

15. An apparatus comprising a processor configured to cause a 5G NR cellular wireless device to:
determine that a transmission medium is clear;
transmit a request to send (RTS) to a second device during first symbols of a self-contained mini slot, wherein the self-contained mini-slot is a time interval including time resources for both the RTS and a clear to send (CTS), wherein transmitting the RTS is based on the determination that the transmission medium is clear;
receive the CTS and reference signals associated with the CTS from the second device during one or more second symbols of a self-contained mini slot;
wherein the CTS is received in a wireless medium, wherein the reference signals associated with the CTS are received using frequency resource elements in the wireless medium different than the CTS, wherein the CTS and the reference signals associated with the CTS are at least one of: transmitted with multiple transmit (Tx) beams and/or received with multiple receive (Rx) beams;
determine, based at least in part on the reference signals associated with the CTS, beamforming information; and
transmit data to the second device using the beamforming information in response to the CTS.

16. The apparatus of claim 15,
wherein the RTS comprises information about a requested transmission,
wherein the data is transmitted to the second device according to the information about the requested transmission.

17. The apparatus of claim 15,
wherein, to transmit the RTS, the wireless device transmits the RTS using a first plurality of beams, wherein the wireless device sequentially transmits the RTS using each respective beam of the first plurality of beams for one or more of the first symbols.

18. The apparatus of claim 17,
wherein, to receive the CTS and the reference signals associated with the CTS, the wireless device receives the CTS and the reference signals associated with the CTS using a second plurality of beams, wherein the wireless device sequentially receives the CTS and the reference signals associated with the CTS using each respective beam of the second plurality of beams for one or more of the second symbols.

19. The apparatus of claim 18, the processor further configured to cause the wireless device to:
determine second beamforming information based on the and the reference signals associated with the CTS; and
transmit the second beamforming information to the second device.

20. The apparatus of claim 15,
wherein the beamforming information is indicated in the CTS.

* * * * *